UNITED STATES PATENT OFFICE.

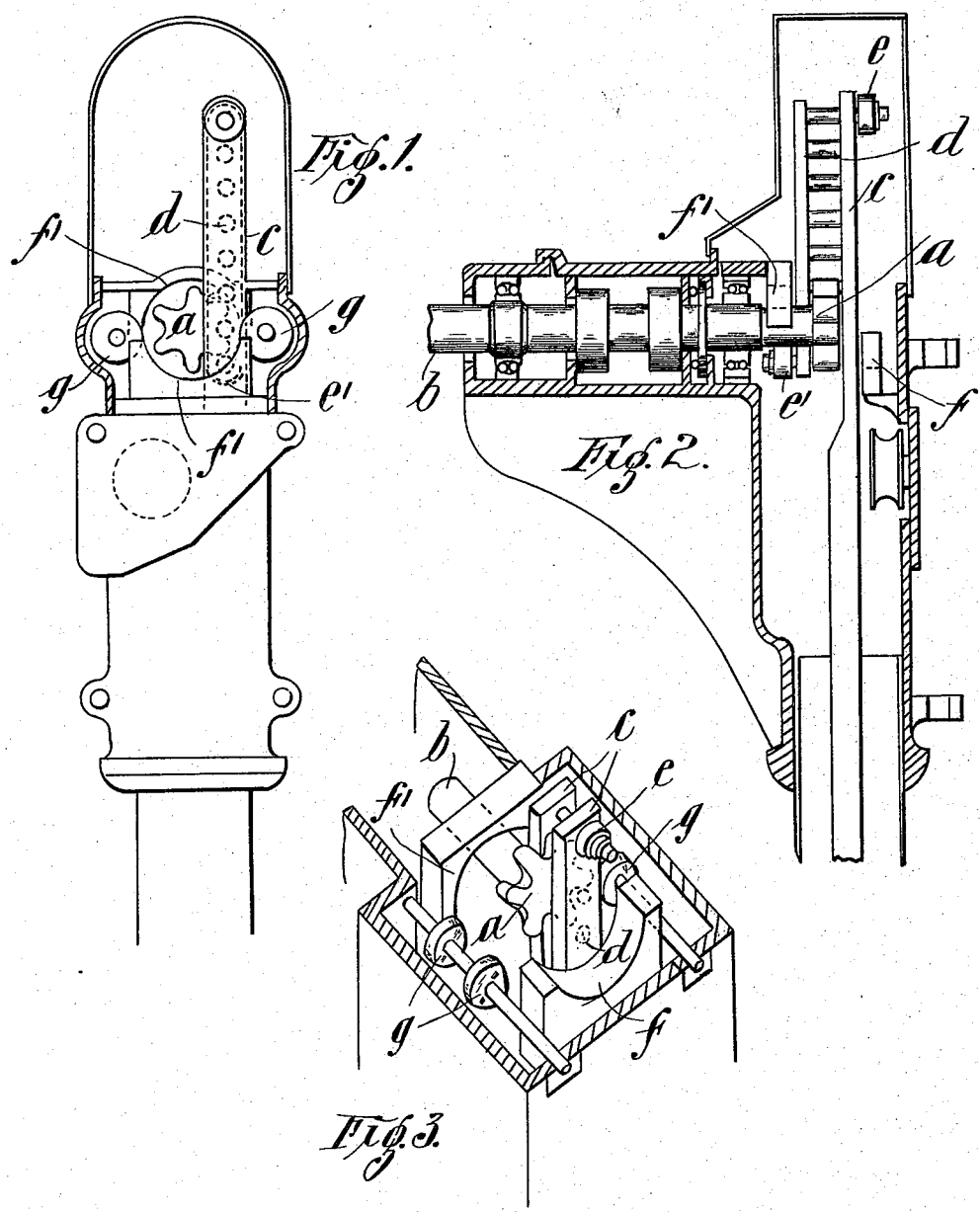

HENRY WATSON WILLIAMS, OF PERTH, WESTERN AUSTRALIA, AUSTRALIA.

MOTION-CONVERTING DEVICE.

1,167,238.  Specification of Letters Patent.  Patented Jan. 4, 1916.

Application filed May 19, 1913. Serial No. 768,612.

*To all whom it may concern:*

Be it known that I, HENRY WATSON WILLIAMS, a subject of the King of Great Britain, residing at Perth, Western Australia, Commonwealth of Australia, have invented certain new and useful Improvements in Motion-Converting Devices, of which the following is a specification.

This invention relates to motion converting devices, and it proposes, briefly, an improved device, particularly applicable in connection with windmills and the like, for converting the rotary motion of the wheel or other drive shaft into reciprocatory motion of the element to be driven, the device comprising a rack operated by a toothed pinion and provided with a pair of rollers adapted to alternately engage guides at each end of its stroke to assist in effecting the return movement.

According to the present invention the aforementioned rollers are located on the diametrically-opposite corners of the rack in alinement with the topmost and bottommost teeth thereof, these rollers being adapted to alternately engage with semi-circular guides, the centers of which aline with the center of the pinion, so that the rack is thereby caused at the end of its forward and backward travel to be shifted by the pinion around to its other side on the reverse stroke, while the upper roller engages with the lower guide at the reverse of the stroke and the lower roller with the upper guide at the upper reverse of the stroke.

The invention will be now more particularly described by reference to the accompanying drawing in which:—

Figure 1 is a side elevation, partly in section, of an embodiment thereof; Fig. 2 is a vertical section taken at right angles to Fig. 1; and Fig. 3 is a sectional perspective view.

The invention consists in the employment of a toothed pinion $a$ mounted on the shaft $b$ of the mill at the opposite end from the wind wheel. Engaging with this pinion is a rack $c$ of ladder-like construction, having round rungs or teeth $d$, between which the teeth of the pinion $a$ project. The ladder rack $c$ has opposite side members between which the teeth $d$ are secured, the pinion being partially embraced by this rack, and the opposite side edges of the members of the rack are clear for engagement by means which will be presently described for maintaining the rack in gear with the pinion.

On the upper and lower ends of the rack $c$ and at diametrically opposite corners, are a pair of rollers $e$ and $e^1$ which have their axes alining with those of the topmost and bottommost rack teeth, respectively, and which engage, alternately, on the up- and down-strokes of the rack with a pair of semi-circular guide channels $f$ and $f^1$. Said channels are arranged in inverted relation to each other, on opposite sides of the mill head, casting, one above and the other below the axis of the shaft $b$, their centers alining with the said axis of said shaft.

On the upward movement of the rack $c$, the lower roller $e^1$ engages and travels in the upper semi-circular guide channel $f^1$, while on the downward movement of said rack, the upper roller $e$ engages and travels in the lower semi-circular guide channel $f$. The rack is kept in gear by front and rear rollers $g$. These rollers $g$ are arranged in pairs at opposite sides of the rack to alternately engage the edges of the members of the said rack. Moreover, the guides $f$ and $f^1$ are disposed on opposite sides of the pinion $a$ and likewise the rollers $e$ and $e^1$ are located at the opposite sides of the rack so as to respectively engage the guides $f$ and $f^1$.

I claim as my invention:

A motion converting device of the character specified, comprising a horizontal rotary driving shaft, a pinion fixed to the one free end of said shaft, a vertical reciprocatory driven element having a ladder rack located at the upper end thereof and comprising opposite members with exposed edges and teeth between the said members, rollers mounted on the ladder rack in alinement with the axes of the uppermost and lowermost teeth of said rack, a pair of fixed semicircular guides disposed adjacent to the opposite side members of the rack in the paths of said rollers for alternate engagement by the latter at the ends of the up and down strokes of the rack, said guides being arranged in inverted relation to each other one above and the other below the axis of said shaft and with their centers in alinement with the said axis, and pairs of spaced rollers mounted in opposite relation to the rack for alternate engagement with the edges of the rack members to maintain the rack in gear with the pinion on the shaft.

In testimony whereof I have hereunto set my hand in presence of two subscribing witnesses.

HENRY WATSON WILLIAMS.

Witnesses:
RICHARD SPARROW,
FREDERICK CHARLES WALTHAM.

Copies of this patent may be obtained for five cents each, by addressing the "Commissioner of Patents, Washington, D. C."